(12) United States Patent
Driscoll et al.

(10) Patent No.: US 8,266,897 B2
(45) Date of Patent: Sep. 18, 2012

(54) LOW TEMPERATURE EMISSION SYSTEM HAVING TURBOCHARGER BYPASS

(75) Inventors: James Joshua Driscoll, Dunlap, IL (US); Michael Steven Bond, Chillicothe, IL (US); Maarten Verkiel, Peterborough (GB); Michael Anthony Haughney, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1215 days.

(21) Appl. No.: 11/646,438

(22) Filed: Dec. 28, 2006

(65) Prior Publication Data

US 2008/0155971 A1    Jul. 3, 2008

(51) Int. Cl.
*F01N 3/00* (2006.01)
(52) U.S. Cl. .......... 60/289; 60/274; 60/280; 60/293; 60/295; 60/298; 60/301
(58) Field of Classification Search ............ 60/274, 60/280, 289, 290, 295, 298, 301, 293
See application file for complete search history.

(56) References Cited

U.S. PATENT DOCUMENTS

| 4,404,805 | A | 9/1983 | Curtil |
|---|---|---|---|
| 4,517,802 | A | 5/1985 | Kobayashi et al. |
| 5,724,813 | A | 3/1998 | Fenelon et al. |
| 5,753,188 | A * | 5/1998 | Shimoda et al. ............ 422/108 |
| 6,276,139 | B1 | 8/2001 | Moraal et al. |
| 6,758,035 | B2 * | 7/2004 | Smaling ..................... 60/285 |
| 6,823,666 | B2 * | 11/2004 | Odendall .................... 60/297 |
| 6,898,928 | B2 * | 5/2005 | Wagner et al. .............. 60/285 |
| 6,941,748 | B2 * | 9/2005 | Pott et al. ................... 60/295 |
| 2002/0000089 | A1 * | 1/2002 | Lundgren et al. ............ 60/298 |
| 2003/0172647 | A1 * | 9/2003 | Tanaka ....................... 60/286 |
| 2004/0112046 | A1 * | 6/2004 | Tumati et al. ............... 60/297 |

FOREIGN PATENT DOCUMENTS

| DE | 10 2004 052 063 | 4/2006 |
|---|---|---|
| EP | 1550796 A1 | 7/2005 |
| JP | 02153215 A | 6/1990 |
| JP | 03145513 A | 6/1991 |
| JP | 09049419 A | 2/1997 |

OTHER PUBLICATIONS

European Search Report and Written Opinion issued Apr. 29, 2008, in PCT/US2007/025258 (8 pages).

* cited by examiner

*Primary Examiner* — Thomas Denion
*Assistant Examiner* — Diem Tran
(74) *Attorney, Agent, or Firm* — Finnegan, Henderson, Farabow, Garrett & Dunner LLP

(57) ABSTRACT

An exhaust system for an engine is disclosed. The exhaust system may have a NOx reducer located to receive exhaust from the engine, and a bypass circuit configured to selectively pass supercharged air to the NOx reducer. The exhaust system may also have a valve disposed within the bypass circuit to regulate the flow of supercharged air, and a controller in communication with the valve. The controller may be configured to move the valve to pass the supercharged air and cool the exhaust received by the NOx reducer. The controller may also be configured to move the valve to reduce the passing of the supercharged air and remove sulfur compounds from the NOx reducer.

20 Claims, 2 Drawing Sheets

LOW TEMPERATURE EMISSION SYSTEM HAVING TURBOCHARGER BYPASS

TECHNICAL FIELD

The present disclosure is directed to an emission system and, more particularly, to a low temperature emission system that implements turbocharger bypass.

BACKGROUND

Internal combustion engines, including diesel engines, gasoline engines, gaseous fuel-powered engines, and other engines known in the art exhaust a complex mixture of air pollutants. These air pollutants may be composed of gaseous compounds such as, for example, the oxides of nitrogen (NOx). Due to increased awareness of the environment, exhaust emission standards have become more stringent, and the amount of NOx emitted from an engine may be regulated depending on the type of engine, size of engine, and/or class of engine. In order to ensure compliance with the regulation of these compounds, some engine manufacturers have implemented use of a device called a denitration device, also known as a NOx adsorber.

A NOx adsorber includes a substrate coated or otherwise impregnated with a catalyst. As exhaust comes into contact with the catalyst-coated substrate, the NOx may be adsorbed and/or converted into harmless compounds that are allowed to pass to the environment.

Although NOx adsorbers may be effective for removing regulated exhaust constituents, their use may be limited. In particular, NOx adsorbers are most effective when the temperature of the exhaust flowing through the adsorbers is maintained within a predetermined range. And, in addition to losing NOx-removal effectiveness as the temperature of the exhaust exceeds this predetermined range, the catalyst and/or the substrate may degrade when the temperature significantly exceeds this range. For this reason, NOx adsorbers may be inappropriate for some applications and/or have a reduced component life when utilized in these applications.

One way to increase the applicability of NOx adsorbers or to increase the component life of the NOx adsorbers may include artificially lowering the temperature of the exhaust passing through the adsorber. One such method is described in Japanese Patent No. 02153215 (the '215 patent) by KUNIHIKO et al. published on Dec. 6, 1990. The '215 patent discloses an internal combustion engine having a turbocharger and an exhaust denitration catalytic device located downstream of the turbocharger. Exhaust from the engine passes through the turbocharger to the denitration catalytic device and, in doing so, compresses air directed into the engine. A bypass route selectively connects high pressure supercharged air from the turbocharger with the exhaust denitration catalytic device. The '215 patent also discloses a temperature sensor set to the inlet side of the exhaust denitration catalytic device, and a controller in communication with the sensor to receive a signal of the exhaust temperature. In response to the temperature exceeding a set level of 450° C., the controller opens the bypass route to cool the denitration catalytic device, thereby protecting the integrity of the denitration catalytic device.

Although the strategy described in the '215 patent may extend the component life of a denitration device by lowering the exhaust temperatures passing through the device, it may not allow for necessary and periodic excursions of elevated exhaust temperatures. That is, over time, NOx adsorbers become masked with sulfur and, in order to remove the sulfur for continued use of the NOx adsorbers, the temperature of the adsorbers must be periodically elevated above the typical operating range. Further, the desulfation temperature of a NOx adsorber may be related to the operating temperature range of the NOx adsorber. That is, a NOx adsorber with a higher operating temperature range than a second NOx adsorber may require a higher temperature excursion to remove sulfur than the second NOx adsorber. The '215 patent does not provide for these periodic high temperature excursions.

The system of the present disclosure solves one or more of the problems set forth above.

SUMMARY OF THE INVENTION

One aspect of the present disclosure is directed to an exhaust system for an engine. The exhaust system may include a NOx reducer located to receive exhaust from the engine, and a bypass circuit configured to selectively pass supercharged air to the NOx reducer. The exhaust system may also include a valve disposed within the bypass circuit to regulate the flow of supercharged air, and a controller in communication with the valve. The controller may be configured to move the valve to pass the supercharged air and cool the exhaust received by the NOx reducer. The controller may also be configured to move the valve to reduce the passing of the supercharged air and remove sulfur compounds from the NOx reducer.

Another aspect of the present disclosure is directed to a method of treating an exhaust flow. The method may include passing supercharged air to the exhaust flow. The method may also include reducing the passing of supercharged air to initiate a desulfation process.

DETAILED DESCRIPTION

Figure 1:
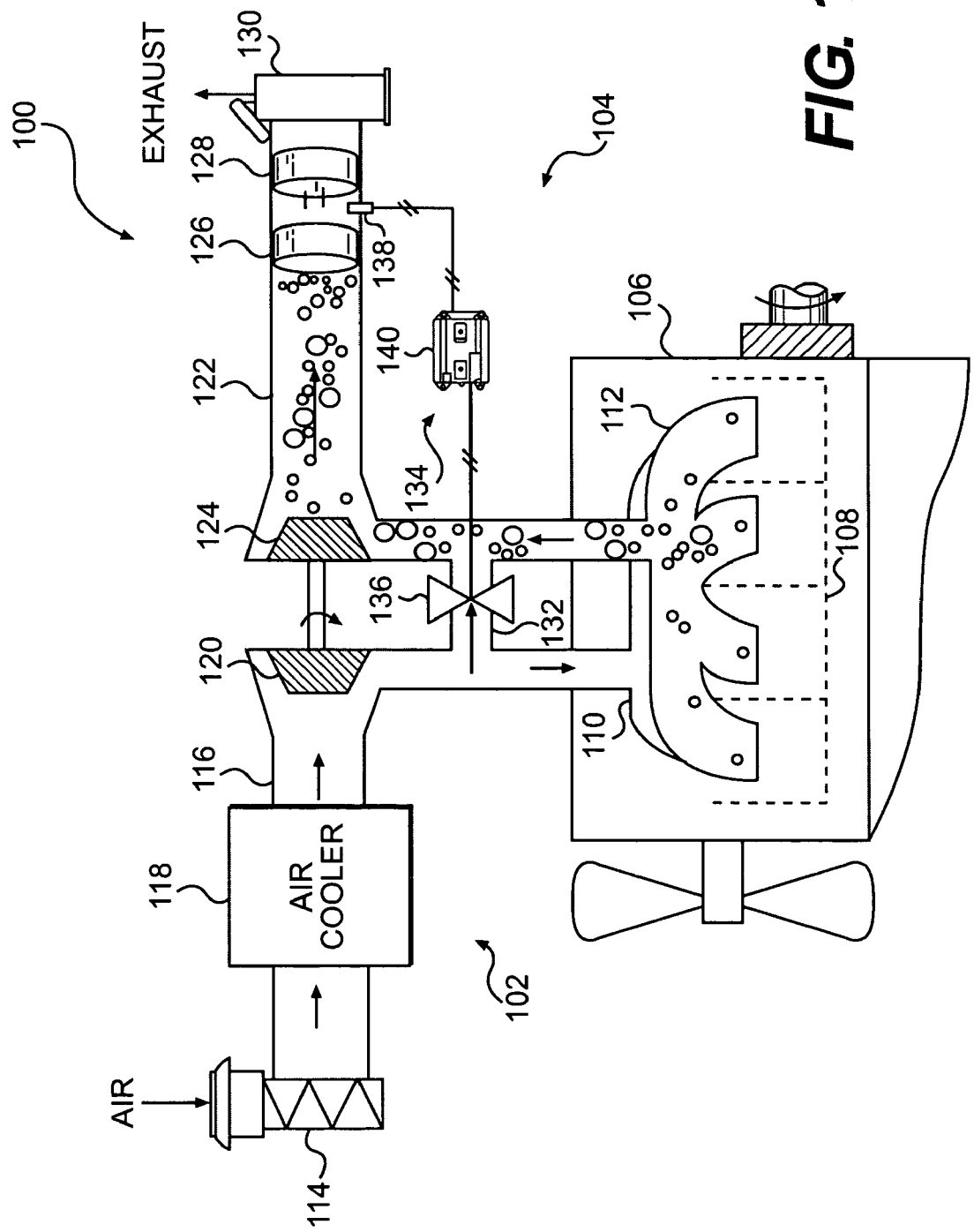
FIG. 1 is a schematic and diagrammatic illustration of an exemplary disclosed power system.

FIG. 1 illustrates a power unit 100 having an air induction circuit 102 and an exhaust circuit 104. For the purposes of this disclosure, power unit 100 is depicted and described as a four-stroke diesel engine. One skilled in the art will recognize, however, that power unit 100 may be any other type of internal combustion engine such as, for example, a gasoline engine, a gaseous fuel-powered engine, or any other type of engine. Further, power unit 100 may be any other type of power and exhaust producing device such as, for example, a furnace.

Power unit 100 may include an engine block 106 that at least partially defines a plurality of combustion chambers 108 in fluid communication with both an intake manifold 110 and an exhaust manifold 112. In the illustrated embodiment, power unit 100 includes four combustion chambers 108. However, it is contemplated that power unit 100 may include a greater or lesser number of combustion chambers 108 and that combustion chambers 108 may be disposed in an "in-line" configuration, a "V" configuration, or any other suitable configuration.

Power unit 100 may compress a mixture of fuel and air, which is then controllably combusted to produce a power output and a flow of exhaust. Each combustion chamber 108 may receive fuel and air from intake manifold 110, house the combustion of the fuel and air, and direct exhaust resulting from the combustion process to exhaust manifold 112. The exhaust may contain carbon monoxide, oxides of nitrogen, carbon dioxide, aldehydes, soot, oxygen, nitrogen, water vapor, and/or hydrocarbons such as hydrogen and methane. One skilled in the art will recognize that power unit 100 may include a plurality of other components to facilitate the combustion process, such as a fuel tank, one or more fuel injectors, various control valves, a pre-combustion chamber, an exhaust gas recirculation (EGR) circuit, or other components consistent with the process of generating power and exhaust.

Air induction circuit 102 may include components that introduce supercharged air into combustion chambers 108 of power unit 100 via intake manifold 110. For example, air induction circuit 102 may include an air inlet port 114, an intake passageway 116 in fluid communication with intake manifold 110, an air cooler 118, and a compressor 120. It is contemplated that additional and/or different components may be included within air induction circuit 102 such as, for example, a wastegate, a bypass system, a control system, and other means known in the art for introducing supercharged air into combustion chambers 108.

Air inlet port 114 may fluidly communicate with intake passageway 116, and may be associated with an air cleaner to clean the air entering air induction circuit 102. Intake passageway 116 may also fluidly communicate air cooler 118 with air inlet port 114.

Air cooler 118 may facilitate the transfer of heat to or from the air inducted into air induction circuit 102 prior to the air entering intake manifold 110. For example, air cooler 118 may embody an air-to-air heat exchanger or a liquid-to-air heat exchanger. Air cooler 118 may include a tube and shell type heat exchanger, a plate type heat exchanger, or any other type of heat exchanger known in the art. In the exemplary embodiment of FIG. 1, air cooler 118 is disposed upstream of compressor 120 and upstream of intake manifold 110. However air cooler 118 may alternatively be located downstream of compressor 120, if desired.

Compressor 120 may be fluidly connected to intake manifold 110 to supercharge the air flowing into power unit 100. Compressor 120 may embody, for example, a fixed geometry compressor, a variable geometry compressor, or any other type of compressor known in the art. It is contemplated that multiple compressors may alternatively be included within air induction circuit 102 and disposed in a series or parallel relationship. It is further contemplated, however, that compressor 120 may be absent, if a naturally-aspirated engine is desired.

Exhaust circuit 104 may include components that treat and fluidly direct the exhaust from combustion chambers 108 via exhaust manifold 112. For example, exhaust circuit 104 may include an exhaust passageway 122 in fluid communication with exhaust manifold 112, a turbine 124, a particulate filter 126, a NOx reducer 128, and an exhaust outlet port 130. Exhaust circuit 104 may further include a bypass flow path 132 and a control system 134. It is contemplated that exhaust circuit 104 may include additional and/or different components than those recited above such as, for example, one or more additional exhaust constituent reducing devices disposed in a series or parallel relationship with NOx reducer 128.

Turbine 124 may be disposed within exhaust passageway 122 to receive the exhaust from combustion chambers 108. Turbine 124 may be connected to drive compressor 120, with turbine 124 and compressor 120, together, embodying a turbocharger. In particular, as the hot exhaust gases exiting power unit 100 expand against the blades (not shown) of turbine 124, turbine 124 may rotate and drive compressor 120. It is contemplated that more than one turbine 124 may alternatively be included within exhaust circuit 104 and disposed in a parallel or series relationship, if desired. It is also contemplated that turbine 124 may be omitted and compressor 120 driven as a supercharger by power unit 100 mechanically, hydraulically, electrically, or in any other manner known in the art, if desired.

Particulate filter 126 may also be disposed within exhaust passageway 122, downstream of turbine 124. As exhaust from power unit 100 flows through exhaust passageway 122, particulate filter 126 may remove particulate matter from the exhaust flow. Particulate filter 126 may include, among other things, a wire mesh or ceramic honeycomb filtration medium.

NOx reducer 128 may further be disposed within exhaust passageway 122, downstream of particulate filter 126. NOx reducer 128 may include a catalyst, a NOx adsorber, a NOx absorber, or any other denitration device known in the art. For example, NOx reducer 128 may include one or more substrates coated with or otherwise containing a liquid or gaseous catalyst such as a precious metal-containing washcoat. The catalyst may reduce the by-products of combustion in the exhaust flow by means of, for example, selective catalytic reduction. In one example, a reagent urea may be injected into the exhaust flow upstream of NOx reducer 128. The reagent may decompose to ammonia, which may react with the NOx in the exhaust gas across the catalyst to form H2O and N2. In another example, NOx reducer 128 may also include a NOx trap, such as a barium salt NOx trap, which may trap NOx from the exhaust gas and periodically releases and reduces the NOx across the catalyst to form CO2 and N2. NOx reducer 128 may also oxidize particulate matter that remains in the exhaust flow after passing through particulate filter 126. After passing through NOx reducer 128, the treated exhaust may then be fluidly directed through exhaust outlet port 130 into the atmosphere.

Bypass flow path 132 may fluidly communicate intake passageway 116 with exhaust passageway 122 to direct at least a portion of the supercharged air from intake passageway 116 to exhaust passageway 122. Bypass flow path 132 may include an inlet in fluid communication with intake passageway 116 and an outlet in fluid communication with exhaust passageway 122, and contain a valve 136 to control the flow of supercharged air through bypass flow path 132. In the illustrated embodiment, the inlet may be located downstream of air cooler 118 and compressor 120. However, it is contemplated that the inlet may alternatively be located upstream of air cooler 118, if desired. Similarly, the illustrated embodiment depicts the outlet upstream of turbine 124 and particulate filter 126. However, it is contemplated that the outlet may alternatively be located downstream of either or both of turbine 124 and particulate filter 126, as long as the outlet is located upstream of NOx reducer 128.

Valve 136 may be disposed within bypass flow path 132 to regulate the flow of supercharged air from air induction circuit 102 to exhaust circuit 104. Valve 136 may include, for example, a butterfly valve element, a spool valve element, a gate valve element, a ball valve element, a globe valve element, or any other type of valve element known in the art. The element of valve 136 may be movable between a flow-passing position and a flow-blocking position. The position of the valve element of valve 136 between the flow-passing and flow-blocking positions may, at least in part, affect the flow rate and/or pressure of supercharged air directed into exhaust circuit 104. More specifically, valve 136 may selectively allow, block, or partially block the flow of supercharged air from intake passageway 116 into exhaust passageway 122, thereby adjusting the air-to-exhaust ratio of gases passed through NOx reducer 128. This adjusting may be utilized to artificially alter the temperature of the exhaust flow. That is, the air-to-exhaust ratio of the exhaust flow may be inversely related to the temperature of the exhaust flow. For example, when valve 136 is set in flow-blocking position, the temperature of the exhaust flow passing through NOx reducer 128 may be at a maximum. As valve 136 is moved toward the flow-passing position, the amount of supercharged air flowing through bypass flow path 132 may increase and, thereby, reduce the temperature of the exhaust/air mixture passing through NOx reducer 128. The coolest temperature of the exhaust flow may correspond to the completely open flow-passing position of valve 136. Valve 136 may be at least partially open during normal operations of power unit 100.

Control system 134 may include a sensor 138, and a controller 140 in communication with sensor 138 and valve 136. Sensor 138 may be a temperature sensor including a sensing electrode (not shown), an output line (not shown), and a power input (not shown). The sensing electrode may be sensitive to the temperature in its vicinity, and the output line may drive a voltage or current corresponding to the temperature sensed by the sensing electrode. The relationship between the temperature sensed and the magnitude of the driven output signal may be linear. For example, the output line may drive an output signal of 5.00 mA when the sensing electrode is in the presence of 500° C., while the output line may drive an output signal of 4.00 mA when the sensing electrode is in the presence of 400° C. It is contemplated that the relationship between the temperature sensed and the magnitude of the driven output signal may alternatively be non-linear, if desired. The power input to sensor 138 may be one or more DC voltage lines required to power integrated circuitry involved in the implementation of sensor 138. It is contemplated that one or more of the exemplary features of sensor 138 may be omitted, or other features included in sensor 138, provided that sensor 138 may sense the temperature at a particular location and produce an output signal corresponding to the same. Sensor 138 may be disposed within exhaust passageway 122, downstream of bypass flow path 132 and upstream of NOx reducer 128, to sense the temperature in that vicinity. It is contemplated. however, that sensor 138 may alternatively be disposed either upstream or downstream of either or both of turbine 124 and particulate filter 126, as long as sensor 138 is positioned downstream of bypass flow path 132 and in the general vicinity of NOx reducer 128.

Controller 140 may embody a single microprocessor or multiple microprocessors that include a means for actuating the movement of the elements of valve 136 in response to the signal generated by sensor 138. For example, controller 140 may include a memory, a secondary storage device, a clock, and a processor, such as a central processing unit or any other means for actuating the movement of the elements of valve 136 in response to the signal generated by sensor 138. Numerous commercially available microprocessors can be configured to perform the functions of controller 140. It should be appreciated that controller 140 could readily embody a general power source microprocessor capable of controlling numerous power source functions. Various other known circuits may be associated with controller 140, including power supply circuitry, signal-conditioning circuitry, solenoid driver circuitry, communication circuitry, and other appropriate circuitry. It should also be appreciated that controller 140 may include one or more of an application-specific integrated circuit (ASIC), a field-programmable gate array (FPGA), a computer system, and a logic circuit, configured to allow controller 140 to function in accordance with the present disclosure. Thus, the memory of controller 140 may embody, for example, the flash memory of an ASIC, flip-flops in an FPGA, the random access memory of a computer system, or a memory circuit contained in a logic circuit. Controller 140 may be further communicatively coupled with an external computer system, instead of or in addition to including a computer system.

Although not illustrated, controller 140 may be communicatively coupled with input and output components such as, for example, a computer monitor, a printer, an alarm, a warning light, and a direct input button or switch. The computer monitor, printer, alarm, and/or warning light may be activated in response to fault conditions. The direct input button or switch may activate or deactivate aspects of controller's 140 functions, and may allow a user to interface with controller 140.

Controller 140 may communicate with the valve elements of valve 136 to move valve 136 between flow-passing and flow-blocking positions. For example, controller 140 may actuate valve 136 to allow or disallow the flow of cooled supercharged air from intake manifold 110 to exhaust manifold 112 via bypass flow path 132. More specifically, controller 140 may actuate valve 136 to be completely open, partially open, or completely closed to selectively pass, restrict, or block the cooled supercharged air through bypass flow path 132. Thus, controller 140 may set the position of valve 136 to at least partially determine the amount of supercharged air allowed to flow through bypass flow path 132.

Controller 140 may also receive and process the signal generated by sensor 138. Specifically, controller 140 may monitor the signal generated by sensor 138 during operation of power unit 100, and actuate the movement of valve 136 in response to the signal. More specifically, controller 140 may allow the flow of supercharged air through bypass flow path 132 to cool the exhaust when the signal generated by sensor 138 falls outside of a predetermined range such as, for example, above 4.00 mA. Similarly, controller 140 may monitor the amount of time in real-time or machine-hours that passes between desulfation processes, and block the flow of supercharged air through bypass flow path 132 to keep the exhaust at its hottest temperature if the elapsed time reaches or surpasses a predetermined threshold such as, for example, 100 hours. It is contemplated that controller 140 may block the flow of supercharged air through bypass flow path 132 in response to other events in addition to or instead of in response to an elapsed time interval. For example, controller 140 may block the flow of supercharged air through bypass flow path 132 when a user of power unit 100 presses a button (not shown) or switch (not shown) communicatively coupled with controller 140, or in response to a signal generated by a NOx sensor (not shown) disposed within exhaust passageway 122 downstream of NOx reducer 128 indicating that an unacceptably high level of NOx is exiting NOx reducer 128.

Controller 140 may block the flow of supercharged air through bypass flow path 132 in order to artificially increase the temperature of the exhaust gas passing through NOx reducer 128 as part of a desulfation process. This excursion of high temperature exhaust gas may serve to reduce sulfur collected on or in NOx reducer 128. More specifically, during operation of power unit 100, sulfur may collect on or in NOx reducer 128, masking parts of NOx reducer 128 and decreasing the efficiency thereof. When the exhaust gas passing through NOx reducer 128 is allowed to increase, NOx reducer 128 may heat up and loosen or burn the sulfur, thus reducing the amount of sulfur collected on or in NOx reducer 128. Thus, controller 140 may block the flow of supercharged air through bypass flow path 132 to thereby increase the temperature of the exhaust passing through NOx reducer 128 and initiate the reduction of sulfur on or in NOx reducer 128.

In order to determine when to actuate the movement of valve 136, controller 140 may compare the signal generated by sensor 138 to a reference value stored in controller's 140 memory. The reference value may include the magnitude and/or polarity of the current or voltage corresponding to the signal generated by sensor 138 in response to the highest and lowest allowable temperatures of exhaust gas for efficient NOx reduction during normal operation of power unit 100. For example, NOx reducer 128 may reduce NOx most efficiently when the exhaust passing through it is between 350° C. and 400° C., and the reference values corresponding to these temperatures may be 3.50 mA and 4.00 mA, respectively. In one exemplary situation, sensor 138 may generate a signal of 4.10 mA. Controller 140 may receive the signal, determine that it is greater than the reference value corresponding to the highest allowable temperature, and actuate the valve elements of valve 136 to unblock or partially unblock the flow of supercharged air through bypass flow path 132.

Controller 140 may also compare the elapsed time between desulfation processes to a predetermined threshold. The predetermined threshold may be a measurement of time stored in controller's 140 memory. For example, the predetermined threshold may be about 100 hours. Controller 140 may calculate the time elapsed since the last desulfation process, compare this time to the reference value of 100 hours, and actuate the valve elements of valve 136 to block or partially block the flow of supercharged air through bypass flow path 132 in response thereto. It is contemplated that controller 140 may similarly actuate valve 136 to block or partially block the flow of supercharged air through bypass flow path 132 in response to the signal generated by sensor 138. Specifically, controller 140 may initiate a desulfation process by blocking or partially blocking the flow of supercharged air through bypass flow path 132 such that the signal generated by sensor 138 remains above a predetermined threshold for the duration of a typical desulfation process. For example, a typical desulfation process may require that the temperature of exhaust gases passing through NOx reducer 128 remain above 450° C. for 10 minutes. Thus, controller 140 may block or partially block the flow of supercharged air through bypass flow path 132 such that the signal generated by sensor 138 indicates a temperature above 450° C. for 10 minutes. The values of this predetermined threshold and duration of a typical desulfation process may be stored in controller's 140 memory.

Controller 140 may receive and/or change values necessary for operation consistent with the present disclosure. Such values may include, without limitation, the range of values for the signal generated by sensor 138 for efficient NOx reduction, the maximum acceptable time interval between desulfation processes, the threshold of acceptable signals generated by sensor 138 during a desulfation process, and the minimum length of time that a desulfation process must last. Controller 140 may receive any of these values into memory or storage, or as a signal input to a circuit.

Controller 140 may log fault conditions such as, for example, an unacceptably high signal received from sensor 138 when valve 136 is completely open or an unacceptably low signal received from sensor 138 when valve 136 is completely closed. Controller 140 may log faults by printing them to a user interface (not shown) such as a computer screen or printer, listing them in a log file stored in memory or storage, activating an alarm (not shown) or a warning light (not shown), or possibly by shutting down power unit 100. It is also contemplated that, rather than or in addition to logging a fault condition, controller 140 may track and record the detected signal generated by sensor 138.

It is contemplated that sensor 138 may be omitted and/or controller 140 may be configured to actuate the movement of the valve elements of valve 136 in response to other events. For example, controller 140 may actuate the valve elements of valve 136 to unblock or partially unblock the flow of supercharged air through bypass flow path 132 in response to an estimated temperature. Temperature may be estimated by comparing an engine speed, fueling rate, air flow, and other parameters to a relationship map stored in a memory of controller 140 or an equation utilizing these parameters. The map and/or equation may be developed based on laboratory and/or field tests with that particular model of engine.

Figure 2:
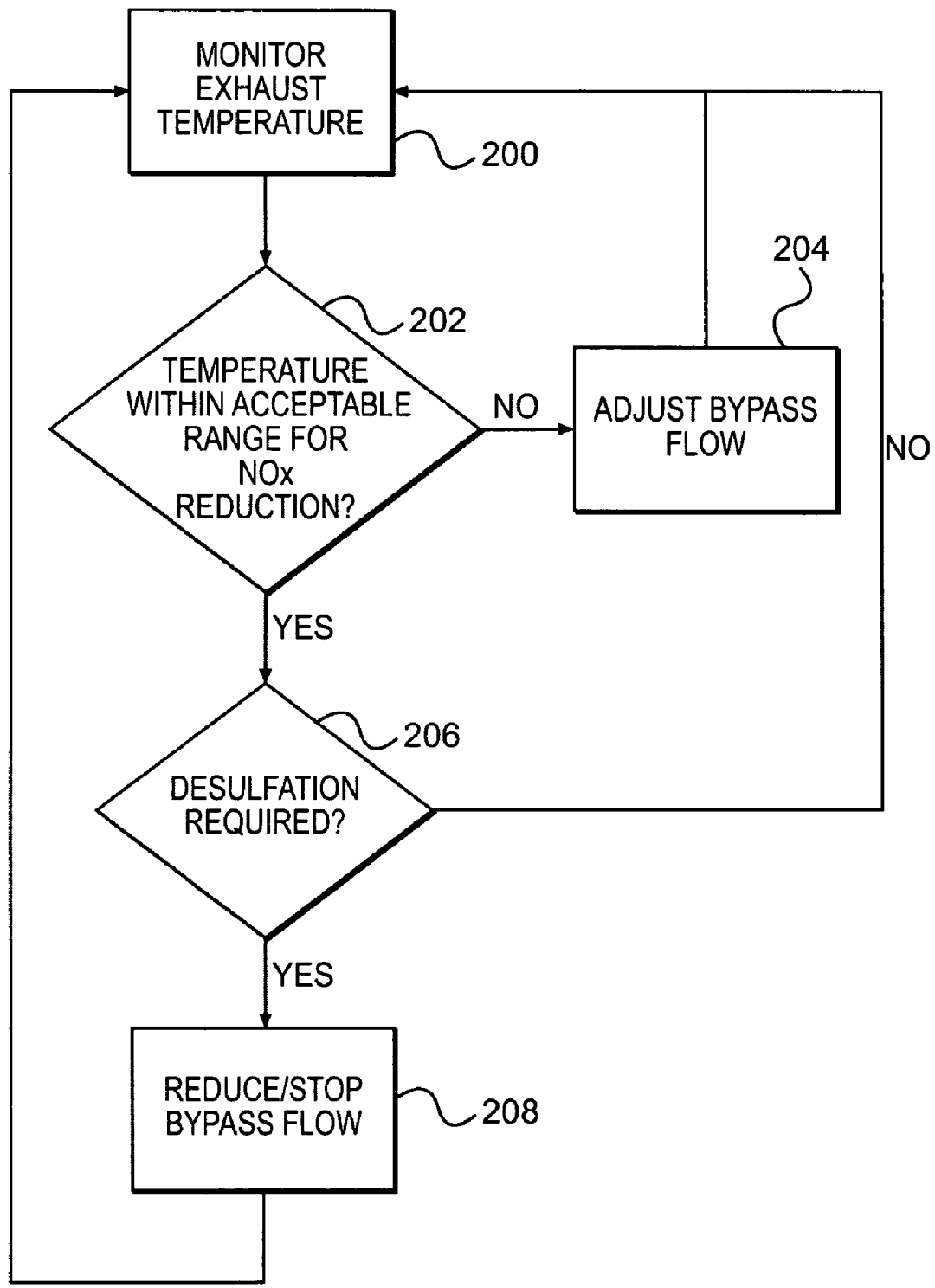
FIG. 2 is a flowchart depicting an exemplary disclosed operation of the power system of FIG. 1.

An exemplary operation of control system 134 is illustrated in FIG. 2. The exemplary operation of FIG. 2 is discussed below.

Industrial Applicability

The disclosed exhaust system may be applicable to any combustion-type device including, for example, an engine, a furnace, and other similar devices known in the art. In fact, the disclosed control system and method of treating exhaust may be implemented into any engine system that benefits from a NOx reducer that must undergo periodic desulfation and reduces NOx most efficiently when operating within a particular temperature range. The disclosed exhaust system may raise the temperature to within the particular range, lower the temperature to within the particular range, and periodically drive the temperature to exceed the range. The operation of power unit 100 will now be explained.

Referring to FIG. 1, atmospheric air may be drawn into air induction circuit 102 through air inlet port 114 and intake passageway 116 toward combustion chambers 108 for combustion with fuel. While passing through intake passageway 116, the air may pass through air cooler 118 and be directed through compressor 120 and into power unit 100. The cooled, supercharged air may then be directed to mix with fuel before or after entering combustion chambers 108, where it may be combusted by power unit 100. The combustion of fuel and air may produce a mechanical work output and a hot high-pressure exhaust flow containing gaseous compounds and solid particulate matter. This exhaust flow may then be directed from combustion chambers 108 through exhaust manifold 112 to exhaust circuit 104.

While passing through exhaust circuit 104, the exhaust flow may enter turbine 124. As the exhaust enters turbine 124, the expansion of hot exhaust gases may cause turbine 124 to rotate. The rotation of turbine 124 may cause compressor 120 to rotate and compress the air in air induction circuit 102, thereby facilitating movement of air towards power unit 100 for subsequent combustion. As the hot NOx-laden exhaust flow exits turbine 124, some amount of the solid particulate matter in the exhaust flow may be reduced by means of particulate filter 126. Further, the NOx concentration of the exhaust flow may be reduced by means of NOx reducer 128. The exhaust flow may then flow out of exhaust circuit 104 into the atmosphere via exhaust outlet port 130.

As illustrated in the flowchart of FIG. 2, controller 140 may monitor the temperature signal generated by sensor 138 during operation of power unit 100 (Step 200). Controller 140 may monitor the signal generated by sensor 138 substantially constantly during most, if not all, operations of power unit 100, or only periodically, if desired. Controller 140 may then compare the signal generated by sensor 138 to one or more reference values stored in its memory to determine whether the signal generated by sensor 138 falls within in a predetermined acceptable range associated with efficient NOx removal by NOx reducer 128 (Step 202). That is, NOx reducer 128 may optimally reduce NOx for gases that are above 350° C. and below 400° C., and sensor 138 may generate a linear signal in response to the temperature of the exhaust flowing through NOx reducer 128.

If the signal generated by sensor 138 is outside of the predetermined range, controller 140 may actuate the valve elements of valve 136 to open or restrict the passage of supercharged air through bypass flow path 132 (Step 204). More specifically, if the temperature of the exhaust gases flowing through NOx reducer 128 exceeds the range of acceptable temperatures associated with efficient NOx reduction, controller 140 may actuate the valve elements of valve 136 to increase the amount of supercharged air that is allowed to pass from intake passageway 116 to exhaust passageway 122, via bypass flow path 132. This introduction or increase in the amount of cooled supercharged air in the exhaust flow may serve to reduce the temperature of the exhaust flow to within the acceptable range of temperatures associated with efficient NOx reduction. Similarly, if the temperature of the exhaust flow falls below the acceptable range of temperatures associated with efficient NOx reduction, controller 140 may respond by actuating the valve elements of valve 136 to decrease the flow of cooled supercharged air from intake passageway 116 to exhaust passageway 122. The reduction of the cooled supercharged air may increase the overall temperature of the exhaust flow. In the embodiment of FIGS. 1-2, controller 140 may move valve 136 to cool and heat the exhaust flow in response to a measured temperature. It is contemplated, however, that controller 140 may alternatively move valve 136 to cool and heat the exhaust flow in response to another trigger such as, for example, an estimated temperature.

If the signal generated by sensor 138 indicates a temperature within the acceptable range of temperatures, controller 140 may further check whether NOx reducer 128 requires desulfation (Step 206). Desulfation of NOx reducer 128 may be triggered by, for example, an elapsed period of time since the last desulfation process or an indication of unacceptably high or increasing NOx levels being exhausted through exhaust outlet port 130 into the atmosphere. For example, the acceptable period of time between desulfation processes may be about 100 hours. Thus, when the elapsed period of time since the last desulfation process nears or exceeds 100 hours, controller 140 may initiate a desulfation process. To initiate a desulfation process, controller 140 may actuate valve 136 to block or restrict the flow of supercharged air through bypass flow path 132 (Step 208). This reduction in the amount of cooled supercharged air in the exhaust flow may serve to increase the temperature of the exhaust flow above a minimum required desulfation temperature of NOx reducer 128. It is contemplated that controller 140 may alternatively initiate a desulfation process in response to interaction from a user of power unit 100. For example, a user may press a button or switch communicatively coupled with controller 140 to indicate that a desulfation process should occur.

Controller 140 may resume monitoring the signal generated by sensor 138 (Step 200) after initiating the desulfation process (Steps 204-208). It is contemplated that controller 140 may wait for the desulfation process to end before returning to the operation of Step 200. For example, a desulfation process may last 10 minutes. Controller 140 may actuate valve 136 to completely block the flow of cooled supercharged air through bypass flow path 132 for a period of 10 minutes before returning to the operation of Step 200. Alternatively, controller 140 may monitor the signal generated by sensor 138 during a desulfation process to ensure that the signal indicates a temperature greater than the minimum desulfation temperature for a period of 10 minutes before returning to the operation of Step 200. Further, controller 140 may actuate valve 136 to limit the temperature of the exhaust during a desulfation process to below a maximum degradation temperature of NOx reducer 128.

Those skilled in the art will appreciate that Steps 202, 206 may be completed in any order or concurrently with each other. For example, controller 140 may check whether a desulfation process is required before ensuring that the temperature of the exhaust is within an acceptable range for efficient NOx reduction. In another example, controller 140 may substantially simultaneously check whether a desulfation process is required and whether the temperature of the exhaust is within an acceptable range for efficient NOx reduction. Similarly, controller 140 may give precedence to initiating a desulfation process over adjusting the temperature of the exhaust to fall within an acceptable range for efficient NOx reduction. Further, controller 140 may give precedence to adjusting the temperature of the exhaust to fall within an acceptable range for efficient NOx reduction over initiating a desulfation process.

The present disclosure may provide an exhaust system and method for adjusting the temperature of an exhaust flow that allows for both efficient NOx reduction and prolonged life of the NOx reducer. Specifically, because the system may raise and lower the temperature of the exhaust flow through the NOx reducer, the temperature of the exhaust flow may be maintained within the predetermined range of temperatures for which the NOx reducer is most effective. Further, by maintaining the temperatures of the exhaust flow below a degrading temperature of the NOx reducer, degradation of the catalyst and/or substrate due to high temperatures may be minimized.

The present disclosure may also provide an exhaust system and method for adjusting the temperature of an exhaust flow that allows for desulfation of the NOx reducer with a reduced impact on the NOx reducer's effective life. That is, the system may allow for temporary excursions of high-temperature exhaust to facilitate desulfation of the NOx reducer and, since the temperatures necessary for desulfation may be lower than a degradation temperature of the NOx reducer, the risk of these high-temperature excursions degrading the catalyst and/or substrate may be reduced. Further, because supercharged air may be used to regularly cool the NOx reducer, a NOx reducer having a lower average operating temperature may be utilized. Thus, desulfation may also occur at a lower temperature, further ensuring that the NOx reducer continues to function efficiently after desulfation. Also, because lower temperature NOx reducers may be more robust, component life within the exhaust system may be increased.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. An exhaust system for an engine, comprising:
   a NOx reducer located to receive exhaust from the engine;
   a bypass circuit configured to selectively pass supercharged air to the NOx reducer;
   a valve disposed within the bypass circuit to regulate the flow of supercharged air; and a controller in communication with the valve, the controller being configured to:
- move the valve to pass the supercharged air and cool the exhaust received by the NOx reducer; and
- move the valve to reduce the passing of the supercharged air and remove sulfur compounds from the NOx reducer.

2. The exhaust system of claim 1, wherein the supercharged air cools the exhaust below about 400° C.

3. The exhaust system of claim 1, wherein the passing of the supercharged air is completely stopped to initiate removal of the sulfur compounds.

4. The exhaust system of claim 1, wherein the supercharged air is directed from downstream of a compressor to the NOx reducer.

5. The exhaust system of claim 1, further including a temperature sensor configured to indicate a temperature of the NOx reducer, wherein the controller moves the valve to cool the exhaust in response to the temperature of the NOx reducer.

6. The exhaust system of claim 1, wherein the controller moves the valve to cool the exhaust in response to an estimated temperature.

7. The exhaust system of claim 1, wherein the controller moves the valve to remove the sulfur compounds in response to an elapsed period of time.

8. The exhaust system of claim 1, wherein reducing the passing of the supercharged air increases the exhaust temperature.

9. The exhaust system of claim 8, wherein the exhaust temperature is increased above about 450° C.

10. A method of treating an exhaust flow, comprising:
passing supercharged air to the exhaust flow; and
initiating a desulfation process by reducing the passing of supercharged air to the exhaust flow.

11. The method of claim 10, wherein the supercharged air cools the exhaust below about 400° C.

12. The method of claim 10, wherein reducing the passing of the supercharged air increases the exhaust temperature above about 450° C.

13. The method of claim 10, wherein initiating a desulfation process includes completely stopping the passing of the supercharged air.

14. The method of claim 10, further including sensing a temperature of the exhaust flow, wherein the passing of supercharged air is in response to the sensed temperature.

15. The method of claim 10, further including estimating a temperature of the exhaust flow, wherein the passing of supercharged air is in response to the estimated temperature.

16. The method of claim 10, wherein initiating a desulfation process is in response to an elapsed period of time.

17. The method of claim 10, further including removing NOx from the exhaust flow, wherein the passing of supercharged air improves the NOx removal ability.

18. The method of claim 17, wherein the desulfation process improves the NOx removal capacity.

19. A power unit, comprising:
- an engine configured to combust a fuel/air mixture and produce a flow of exhaust;
- a turbocharger configured to receive the flow of exhaust and compress air directed into the engine;
- a catalytic device situated downstream of the turbocharger to remove NOx from the exhaust;
- a bypass circuit configured to selectively pass a portion of the compressed air from the turbocharger to cool the catalytic device; and
- a controller configured to reduce the passing of compressed air to remove sulfur compounds from the catalytic device.

20. The power unit of claim 19, wherein:
the compressed air cools the catalytic device below about 400° C.; and
the reduced passing of the compressed air increases the exhaust temperature above about 450° C.

* * * * *

UNITED STATES PATENT AND TRADEMARK OFFICE
CERTIFICATE OF CORRECTION

PATENT NO. : 8,266,897 B2  
APPLICATION NO. : 11/646438  
DATED : September 18, 2012  
INVENTOR(S) : Driscoll et al.

Page 1 of 1

It is certified that error appears in the above-identified patent and that said Letters Patent is hereby corrected as shown below:

In the Specification

Column 8, line 18, delete "Industrial Applicability" and insert -- INDUSTRIAL APPLICABILITY --.

Signed and Sealed this  
Eleventh Day of August, 2015

Michelle K. Lee  
*Director of the United States Patent and Trademark Office*